US009646106B2

(12) United States Patent
Ren et al.

(10) Patent No.: US 9,646,106 B2
(45) Date of Patent: May 9, 2017

(54) NAVIGATION SYSTEM WITH SEARCH MECHANISM AND METHOD OF OPERATION THEREOF

(71) Applicant: Telenav, Inc., Sunnyvale, CA (US)

(72) Inventors: Jinghai Ren, Milpitas, CA (US); Kumar Maddali, San Ramon, CA (US); Changzheng Jiang, Santa Clara, CA (US)

(73) Assignee: Telenav, Inc., Santa Clara, CA (US)

( * ) Notice: Subject to any disclaimer, the term of this patent is extended or adjusted under 35 U.S.C. 154(b) by 76 days.

(21) Appl. No.: 14/555,157

(22) Filed: Nov. 26, 2014

(65) Prior Publication Data

US 2016/0146623 A1    May 26, 2016

(51) Int. Cl.
*G01C 21/00* (2006.01)
*G06F 17/30* (2006.01)
*G01C 21/36* (2006.01)

(52) U.S. Cl.
CPC ... *G06F 17/30958* (2013.01); *G01C 21/3682* (2013.01); *G06F 17/30336* (2013.01); *G06F 17/30867* (2013.01)

(58) Field of Classification Search
USPC ........................................................ 701/400
See application file for complete search history.

(56) References Cited

U.S. PATENT DOCUMENTS

| 8,239,130 | B1* | 8/2012 | Upstill ............... G01C 21/3679 701/400 |
| 8,301,371 | B2 | 10/2012 | Sheha et al. |
| 8,433,512 | B1* | 4/2013 | Lopatenko ............. G01C 21/20 701/400 |
| 8,566,029 | B1* | 10/2013 | Lopatenko ........... G08G 1/0962 701/400 |
| 8,589,069 | B1* | 11/2013 | Lehman ................. G01C 21/20 340/995.1 |
| 2006/0123014 | A1* | 6/2006 | Ng ..................... G06F 17/30864 |
| 2011/0307478 | A1* | 12/2011 | Pinckney ............. G06N 99/005 707/724 |
| 2013/0232006 | A1 | 9/2013 | Holcomb et al. |

* cited by examiner

*Primary Examiner* — Hussein A. Elchanti
(74) *Attorney, Agent, or Firm* — IP Investment Law Group

(57) ABSTRACT

A method of operation of a navigation system includes: generating activity logs including a plurality of a travel frequency to a point of interest; generating a search index including a plurality of an index type based on the activity logs with a control unit; generating a preliminary result based on searching the search index with the index type tailored to a search context; and generating a search result based on filtering the preliminary result including the travel frequency meeting or exceeding a travel threshold for displaying on a device.

20 Claims, 6 Drawing Sheets

NAVIGATION SYSTEM WITH SEARCH MECHANISM AND METHOD OF OPERATION THEREOF

TECHNICAL FIELD

The present invention relates generally to a navigation system, and more particularly to a system with search mechanism.

BACKGROUND ART

Modern portable consumer and industrial electronics, especially client devices such as navigation systems, cellular phones, portable digital assistants, and combination devices, are providing increasing levels of functionality to support modern life including location-based information services. Research and development in the existing technologies can take a myriad of different directions.

As users become more empowered with the growth of mobile location based service devices, new and old paradigms begin to take advantage of this new device space. There are many technological solutions to take advantage of this new device location opportunity. One existing approach is to use location information to provide navigation services such as a global positioning system (GPS) for a car or on a mobile device such as a cell phone, portable navigation device (PND) or a personal digital assistant (PDA).

Location based services allow users to create, transfer, store, and/or consume information in order for users to create, transfer, store, and consume in the "real world." One such use of location based services is to efficiently transfer or route users to the desired destination or service.

Navigation systems and location based services enabled systems have been incorporated in automobiles, notebooks, handheld devices, and other portable products. Today, these systems aid users by incorporating available, real-time relevant information, such as maps, directions, local businesses, or other points of interest (POI). The real-time information provides invaluable relevant information.

However, a navigation system without search mechanism to effectively search for results has become a paramount concern for the consumer. The inability to search results effectively decreases the benefit of using the tool.

Thus, a need still remains for a navigation system with search mechanism to search effectively for the user. In view of the increasing mobility of the workforce and social interaction, it is increasingly critical that answers be found to these problems. In view of the ever-increasing commercial competitive pressures, along with growing consumer expectations and the diminishing opportunities for meaningful product differentiation in the marketplace, it is critical that answers be found for these problems. Additionally, the need to reduce costs, improve efficiencies and performance, and meet competitive pressures adds an even greater urgency to the critical necessity for finding answers to these problems. Solutions to these problems have been long sought but prior developments have not taught or suggested any solutions and, thus, solutions to these problems have long eluded those skilled in the art.

DISCLOSURE OF THE INVENTION

The present invention provides a method of operation of a navigation system including: generating activity logs including a plurality of a travel frequency to a point of interest; generating a search index including a plurality of an index type based on the activity logs with a control unit; generating a preliminary result based on searching the search index with the index type tailored to a search context; and generating a search result based on filtering the preliminary result including the travel frequency meeting or exceeding a travel threshold for displaying on a device.

The present invention provides a navigation system, including: a control unit for: generating activity logs including a plurality of a travel frequency to a point of interest, generating a search index including a plurality of an index type based on the activity logs, generating a preliminary result based on searching the search index with the index type tailored to a search context, generating a search result based on filtering the preliminary result including the travel frequency meeting or exceeding a travel threshold, and a communication interface, coupled to the control unit, for communicating the search result for displaying on a device.

The present invention provides a navigation system including a non-transitory computer readable medium including instructions for execution, the instructions comprising: generating activity logs including a plurality of a travel frequency to a point of interest; generating a search index including a plurality of an index type based on the activity logs; generating a preliminary result based on searching the search index with the index type tailored to a search context; and generating a search result based on filtering the preliminary result including the travel frequency meeting or exceeding a travel threshold for displaying on a device.

Certain embodiments of the invention have other steps or elements in addition to or in place of those mentioned above. The steps or element will become apparent to those skilled in the art from a reading of the following detailed description when taken with reference to the accompanying drawings.

BEST MODE FOR CARRYING OUT THE INVENTION

Figure 1:
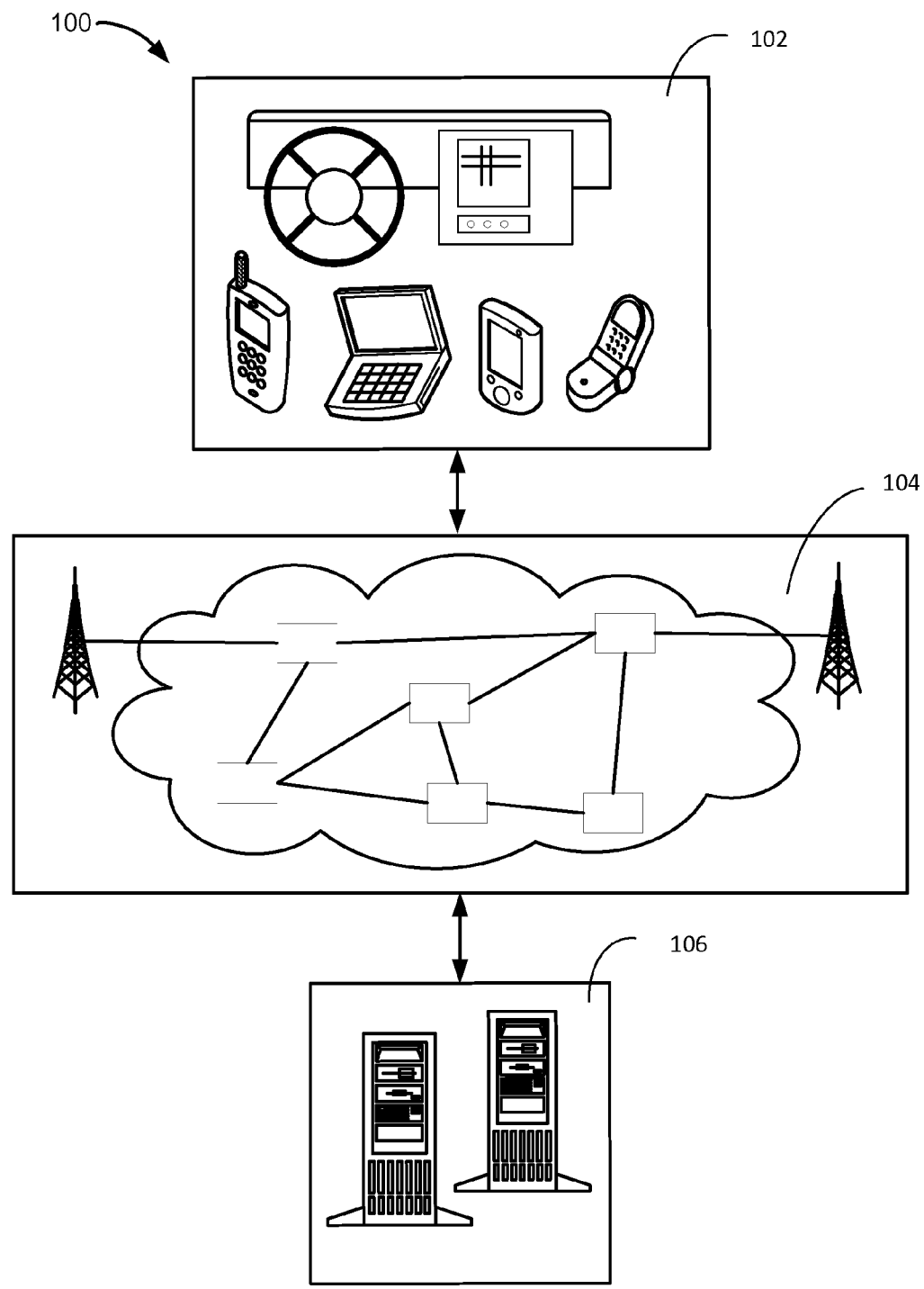
FIG. 1 is a navigation system with search mechanism in an embodiment of the present invention.

The following embodiments are described in sufficient detail to enable those skilled in the art to make and use the invention. It is to be understood that other embodiments would be evident based on the present disclosure, and that system, process, or mechanical changes may be made without departing from the scope of the present invention.

In the following description, numerous specific details are given to provide a thorough understanding of the invention. However, it will be apparent that the invention may be practiced without these specific details. In order to avoid obscuring the present invention, some well-known circuits, system configurations, and process steps are not disclosed in detail.

The drawings showing embodiments of the navigation system 100 are semi-diagrammatic and not to scale and, particularly, some of the dimensions are for the clarity of presentation and are shown exaggerated in the drawing FIGs. Similarly, although the views in the drawings for ease of description generally show similar orientations, this depiction in the FIGs. is arbitrary for the most part. Generally, the invention can be operated in any orientation. The embodiments have been numbered first embodiment, second embodiment, etc. as a matter of descriptive convenience and are not intended to have any other significance or provide limitations for the present invention.

One skilled in the art would appreciate that the format with which navigation information is expressed is not critical to some embodiments of the invention. For example, in some embodiments, navigation information is presented in the format of (X, Y), where X and Y are two ordinates that define the geographic location, i.e., a position of a user.

In an alternative embodiment, navigation information is presented by longitude and latitude related information. In a further embodiment of the present invention, the navigation information also includes a velocity element including a speed component and a heading component.

The term "relevant information" referred to herein includes the navigation information described as well as information relating to points of interest to the user, such as local business, hours of businesses, types of businesses, advertised specials, traffic information, maps, local events, and nearby community or personal information.

The term "module" referred to herein can include software, hardware, or a combination thereof in the present invention in accordance with the context in which the term is used. For example, the software can be machine code, firmware, embedded code, and application software. Also for example, the hardware can be circuitry, processor, computer, integrated circuit, integrated circuit cores, a pressure sensor, an inertial sensor, a microelectromechanical system (MEMS), passive devices, or a combination thereof. Further, if a module is written in the apparatus claims section below, the modules are deemed to include hardware circuitry for the purposes and the scope of apparatus claims.

Referring now to FIG. 1, therein is shown a navigation system 100 with search mechanism in an embodiment of the present invention. The navigation system 100 includes a first device 102, such as a client or a server, connected to a second device 106, such as a client or server, with a communication path 104, such as a wireless or wired network.

For example, the first device 102 can be of any of a variety of mobile devices, such as a cellular phone, personal digital assistant, a notebook computer, automotive telematic navigation system, or other multi-functional mobile communication or entertainment device. The first device 102 can be a standalone device, or can be incorporated with a vehicle, for example a car, truck, bus, or train. The first device 102 can couple to the communication path 104 to communicate with the second device 106.

For illustrative purposes, the navigation system 100 is described with the first device 102 as a mobile computing device, although it is understood that the first device 102 can be different types of computing devices. For example, the first device 102 can also be a non-mobile computing device, such as a server, a server farm, or a desktop computer. In another example, the first device 102 can be a particularized machine, such as a mainframe, a server, a cluster server, rack mounted server, or a blade server, or as more specific examples, an IBM System z10™ Business Class mainframe or a HP ProLiant ML™ server.

The second device 106 can be any of a variety of centralized or decentralized computing devices. For example, the second device 106 can be a computer, grid computing resources, a virtualized computer resource, cloud computing resource, routers, switches, peer-to-peer distributed computing devices, or a combination thereof.

The second device 106 can be centralized in a single computer room, distributed across different rooms, distributed across different geographical locations, embedded within a telecommunications network. The second device 106 can have a means for coupling with the communication path 104 to communicate with the first device 102. The second device 106 can also be a client type device as described for the first device 102. Another example, the first device 102 or the second device 106 can be a particularized machine, such as a portable computing device, a thin client, a notebook, a netbook, a smartphone, a tablet, a personal digital assistant, or a cellular phone, and as specific examples, an Apple iPhone™, Android™ smartphone, or Windows™ platform smartphone.

For illustrative purposes, the navigation system 100 is described with the second device 106 as a non-mobile computing device, although it is understood that the second device 106 can be different types of computing devices. For example, the second device 106 can also be a mobile computing device, such as notebook computer, another client device, or a different type of client device. The second device 106 can be a standalone device, or can be incorporated with a vehicle, for example a car, truck, bus, or train.

Also for illustrative purposes, the navigation system 100 is shown with the second device 106 and the first device 102 as end points of the communication path 104, although it is understood that the navigation system 100 can have a different partition between the first device 102, the second device 106, and the communication path 104. For example, the first device 102, the second device 106, or a combination thereof can also function as part of the communication path 104.

The communication path 104 can be a variety of networks. For example, the communication path 104 can include wireless communication, wired communication, optical, ultrasonic, or the combination thereof. Satellite communication, cellular communication, Bluetooth, Infrared Data Association standard (IrDA), wireless fidelity (WiFi), and worldwide interoperability for microwave access (WiMAX) are examples of wireless communication that can be included in the communication path 104. Ethernet, digital subscriber line (DSL), fiber to the home (FTTH), and plain old telephone service (POTS) are examples of wired communication that can be included in the communication path 104.

Further, the communication path 104 can traverse a number of network topologies and distances. For example, the communication path 104 can include direct connection, personal area network (PAN), local area network (LAN), metropolitan area network (MAN), wide area network (WAN) or any combination thereof.

Figure 2:
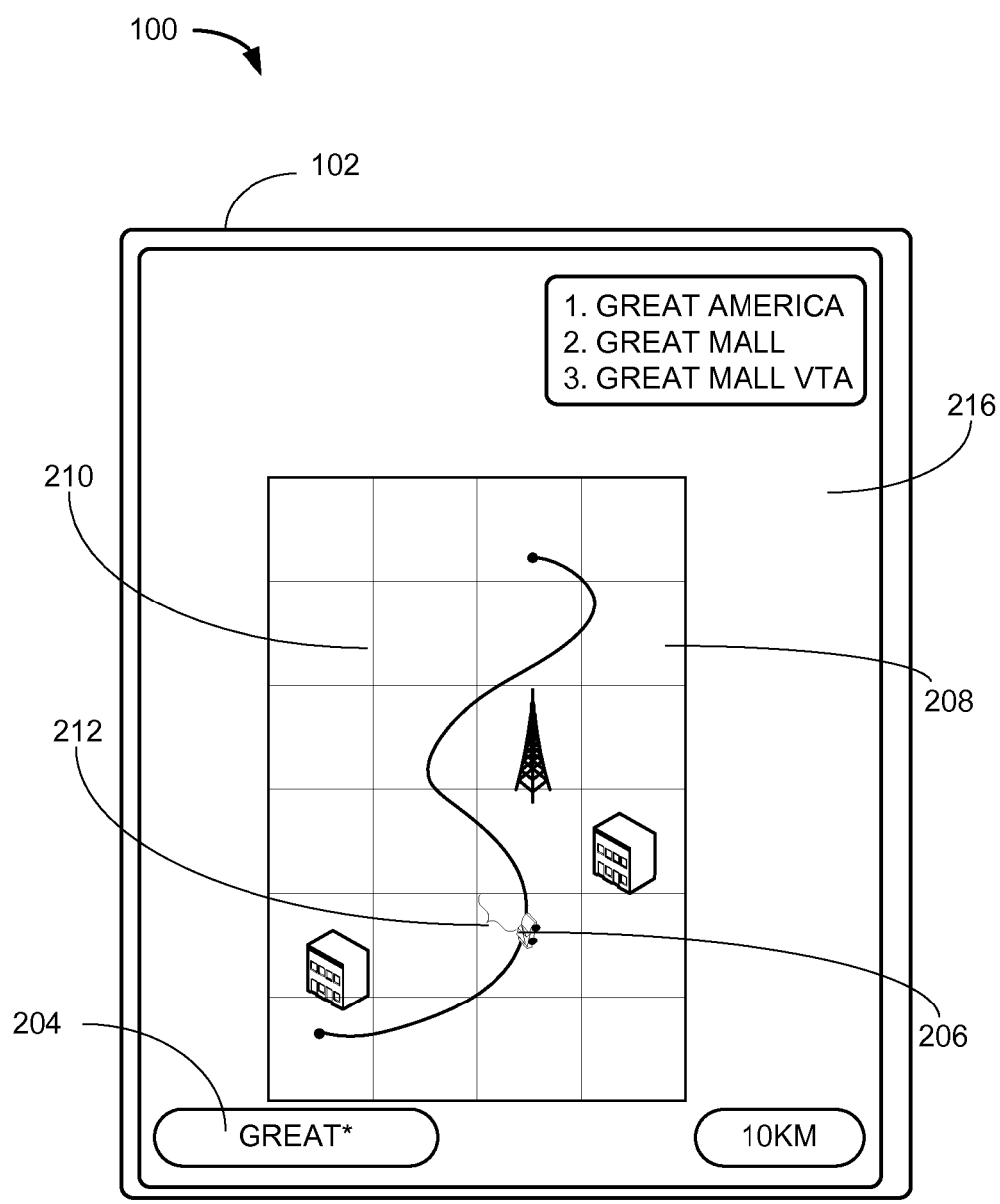
FIG. 2 is an example of presenting a search result.

Referring now to FIG. 2, there is shown an example of presenting a search result 202. For clarity and brevity, the discussion of the embodiment of the present invention focuses on the first device 102 delivering the result generated by the navigation system 100. However, various embodiments of the present invention can easily be applied with the description with the second device 106 of FIG. 1 and the first device 102 interchangeably.

The search result 202 is defined as information presented in response to a query. For example, the user of the navigation system 100 can enter a query input 204 on the first device 102 for the navigation system 100 to generate the search result 202. The search result 202 can represent a set of multiple outcomes or one outcome. The query input 204 is defined as a request for the navigation system 100 to generate the search result 202. For example, the query input 204 can be made by manual input, audio command, gesture, or a combination thereof. For a specific example, the query input 204 can represent "great America."

An input location 206 is defined as a representation of a physical location where the request was made. For example, the input location 206 can indicate where the query input 204 was made. A geofence 208 is defined as a representation of a predefined geographic area. For example, the geofence 208 can include a boundary 210, which is defined as an outer limit or extent to determine the area of the geofence 208.

A predefined distance 212 is defined as a physical distance that's already been set. For example, the navigation system 100 can set the radius of the geofence 208 based on the predefined distance 212 from the input location 206. A distance threshold 214 is defined as a limit required for the predefined distance 212. For example, the navigation system 100 can compare the predefined distance 212 to the distance threshold 214 to filter factors in determining the search result 202.

A search context 216 is defined as situation or circumstance surrounding the first device 102 when the query input 204 is made. For example, the search context 216 can include the weather, the time of day, the traffic, the input location 206, the geographic area, the geofence 208, or a combination thereof. For another example, the search context 216 can include the season of the year, the crime rate of the area, or a combination thereof.

Figure 3:
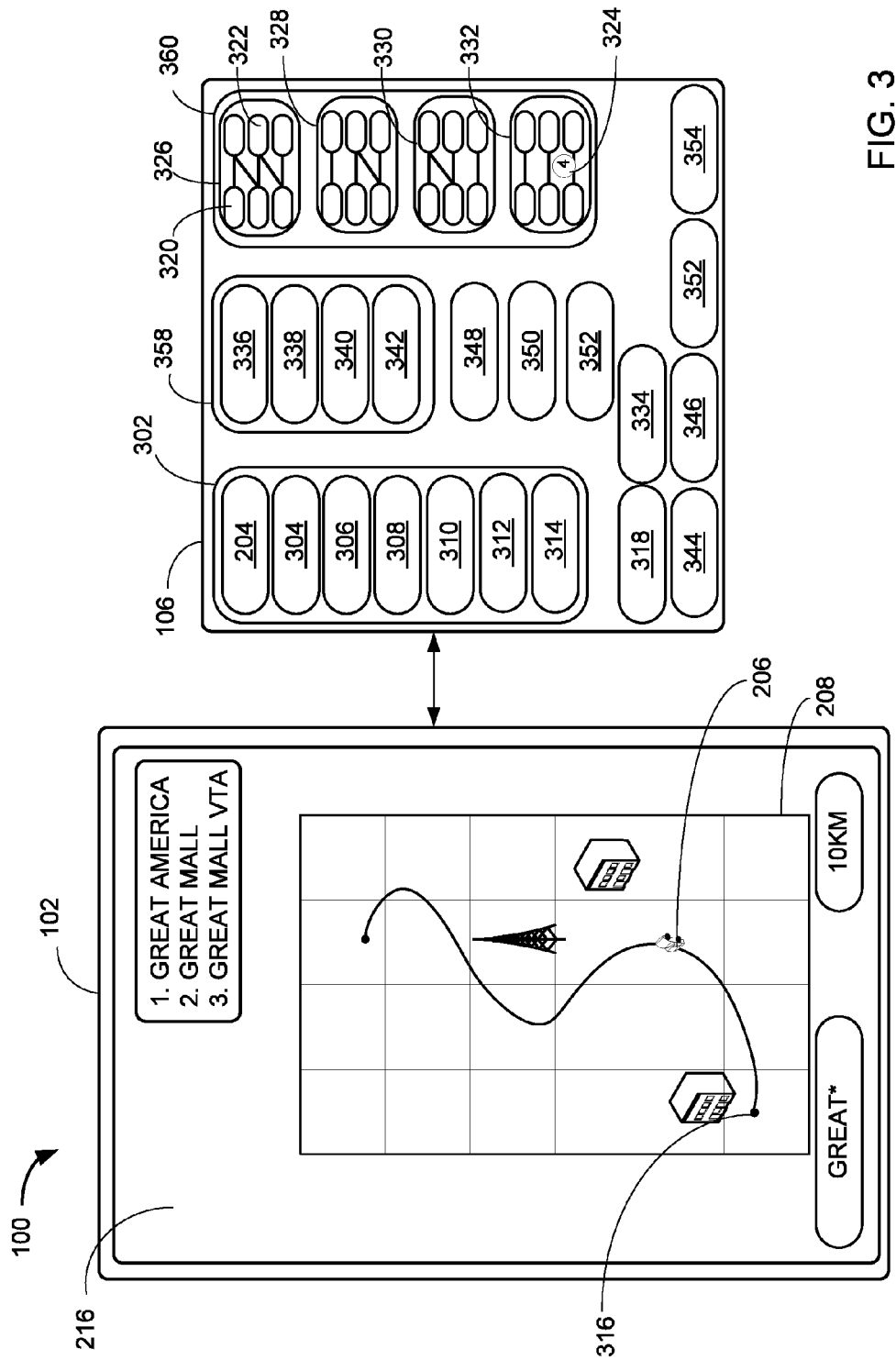
FIG. 3 is examples of factors considered to generate the search result.

Referring now to FIG. 3, there is shown examples of factors considered to generate the search result 202 of FIG. 2. An activity log 302 is defined as record of accessing the navigation system 100. For example, the activity log 302 can keep track of the query input 204 of FIG. 2 made by the user to the navigation system 100. The activity log 302 can include the query input 204, the input location 206 of FIG. 2, a timeframe 304, a point of interest 306, a category of interest 308, or a combination thereof. The activity log 302 can also include a user identification (ID) 310, a group identification (ID) 312, a travel frequency 314, or a combination thereof.

The timeframe 304 is defined as a period of time. For example, the timeframe 304 can represent a time of day, week, month, year, season, or a combination thereof when the query input 204 was made. The point of interest 306 is defined as representation of a physical location. For example, the query input 204 can include the name of the point of interest 306 for the navigation system 100 to generate the search result 202 related to the point of interest 306. For a specific example, the point of interest 306 can represent "Great America," an American amusement park. The category of interest 308 is defined as a classification of the point of interest 306. For example, the category of interest 308 for the point of interest 306 can restaurant, shopping, theme park, service center, or a combination thereof.

The user ID 310 is defined as unique information to identify the user. The group ID 312 is defined as unique information to identify a group of users. For example, a plurality of the user of the navigation system 100 can form a group to distinguish from other users of the navigation system 100. The travel frequency 314 is defined as a number of visits. For example, the travel frequency 314 can represent the number of visits to the point of interest 306, to a location for particular instance of the category of interest 308, or a combination thereof. For a different example, the travel frequency 314 can represent the number of visits to the point of interest 306, to a location with a particular instance of the category of interest 308, or a combination thereof from a particular instance of a starting location 316. The starting location 316 is defined as a representation of physical location where the user's travel starts.

The navigation system 100 can generate a log graph 318, which is defined as a data structure to organize a plurality of the activity log 302. The log graph 318 can be represented as a tree, a bi-graph, or a combination thereof. The navigation system 100 can search the log graph 318 to generate the search result 202. For example, the log graph 318 can include an input node 320, a point of interest (POI) node 322, or a combination thereof. The input node 320 is defined as a vertex representing the query input 204 within the log graph 318. The POI node 322 is defined as a vertex representing the point of interest 306.

A plurality of node for the log graph 318 can be connected by edges including a frequency weight 324. The frequency weight 324 is defined as a factor to prioritize one node over another. For example, the frequency weight 324 can be determined by the travel frequency 314. More specifically as an example, the POI node 322 having an edge with a greater value for the travel frequency 314 can have a greater instance of the frequency weight 324 than another instance of the POI node 322 having an edge with a lesser value of the travel frequency 314.

The log graph 318 can include a plurality of a graph type 360. The graph type 360 can include a public graph 326, a personalized graph 328, a group graph 330, a context graph 332, or a combination thereof. The public graph 326 is defined as the log graph 318 accessible by all users of the navigation system 100. The personalized graph 328 is defined as the log graph 318 accessible by and for a particular user only. The group graph 330 is defined as the log graph 318 accessible by and for a particular group of users only. The context graph 332 is defined as the log graph 318 accessible for a particular instance of the search context 216.

The navigation system 100 can generate a search index 334 based on the log graph 318. The search index 334 is defined as a data structure that the navigation system 100 performs a search on to obtain the search result 202. The search result 202 can be represented by an index type 358 which can include a public index 336, a personalized index 338, a group index 340, a context index 342, or a combination thereof. The index type 358 is defined as a classification of the search index 334.

The public index 336 is defined as the search query 344 searchable by all users of the navigation system 100. The personalized index 338 is defined as the search index 334 searchable by a particular user only. The group index 340 is defined as the search index 334 searchable by a particular group of users only. The context index 342 is defined as the search index 334 searchable for a particular instance of the search context 216.

The navigation system 100 can generate a semantic query 346 to aid the entry of the query input 204 into the navigation system 100. The semantic query 346 can represent the query input 204 that has been autocompleted, autocorrected, or a combination thereof. A search query 344 is defined as a query including an aggregation of factors to reflect user's intent. For example, the search query 344 can include semantic query 346, the input location 206, the geofence 208, or a combination thereof. For further example, the navigation system 100 can execute the search query 344 to search on the search index 334 to obtain a preliminary result 348.

The preliminary result 348 is defined as an unfiltered instance of the search result 202. More specifically as an example, the navigation system 100 can generate the preliminary result 348 prior to presenting the search result 202 to the user. The preliminary result 348 can represent a set of a plurality of the search result 202 or a single instance of the search result 202. A result ranking 350 is defined as a ranking of the preliminary result 348. For example, the navigation system 100 can generate the result ranking 350 according to the travel frequency 314 meeting or exceeding a travel threshold 352. The travel threshold 352 is defined as a minimum requirement for the travel frequency 314.

A result count 354 is a number of results in the search result 202. A result threshold 356 is defined as a minimum number of the result count 354. For example, if the result count 354 is less than the result threshold 356, the navigation system 100 can use the public index 336 instead of the personalized index 338 to obtain the search result 202.

Figure 4:
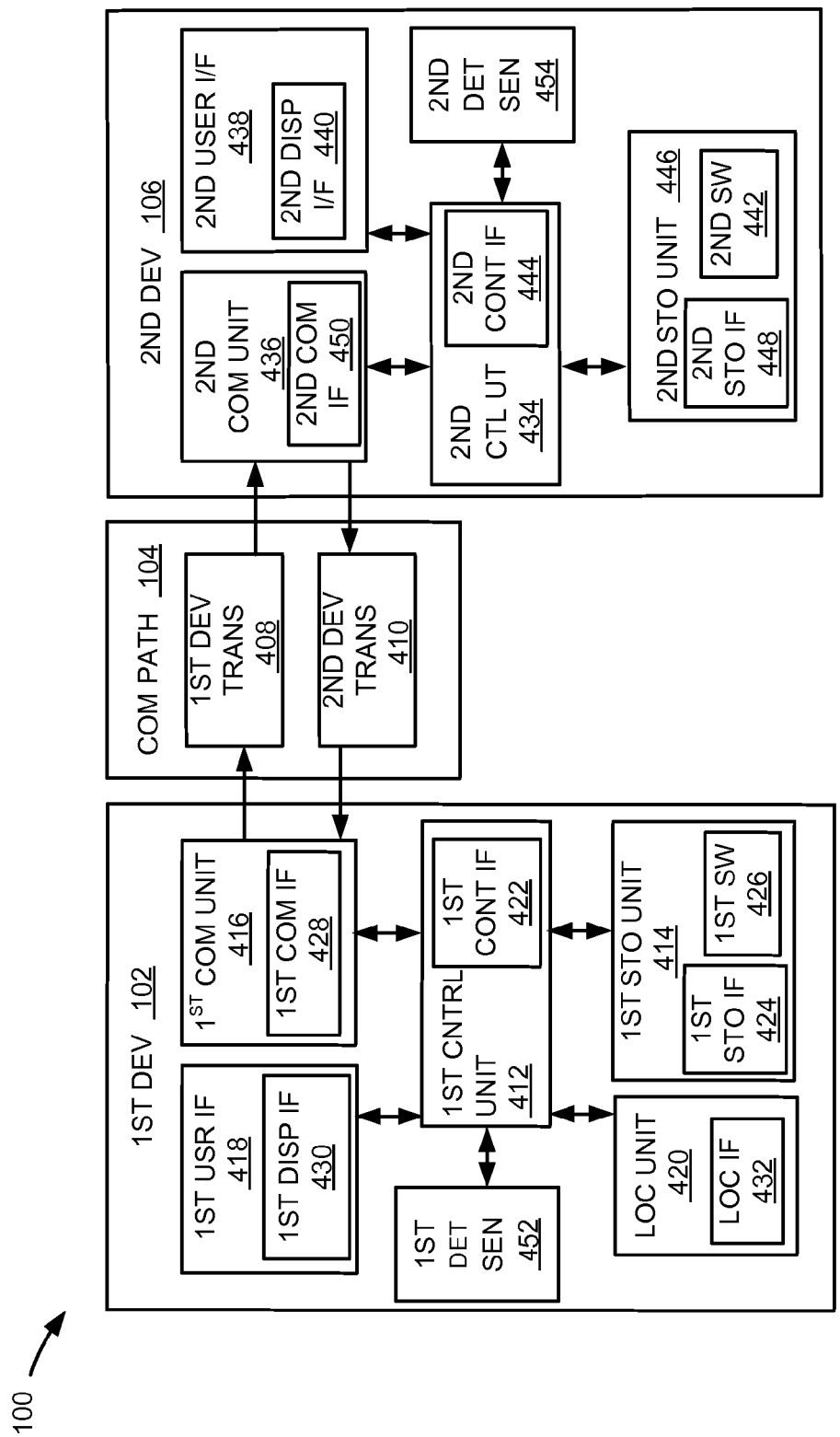
FIG. 4 is an exemplary block diagram of the navigation system.

Referring now to FIG. 4, therein is shown an exemplary block diagram of the navigation system 100. The navigation system 100 can include the first device 102, the communication path 104, and the second device 106. The first device 102 can send information in a first device transmission 408 over the communication path 104 to the second device 106. The second device 106 can send information in a second device transmission 410 over the communication path 104 to the first device 102.

For illustrative purposes, the navigation system 100 is shown with the first device 102 as a client device, although it is understood that the navigation system 100 can have the first device 102 as a different type of device. For example, the first device 102 can be a server.

Also for illustrative purposes, the navigation system 100 is shown with the second device 106 as a server, although it is understood that the navigation system 100 can have the second device 106 as a different type of device. For example, the second device 106 can be a client device.

For brevity of description in this embodiment of the present invention, the first device 102 will be described as a client device and the second device 106 will be described as a server device. The present invention is not limited to this selection for the type of devices. The selection is an example of the present invention.

The first device 102 can include a first control unit 412, a first storage unit 414, a first communication unit 416, a first user interface 418, and a location unit 420. The first control unit 412 can include a first control interface 422. The first control unit 412 can execute a first software 426 to provide the intelligence of the navigation system 100. The first control unit 412 can be implemented in a number of different manners. For example, the first control unit 412 can be a processor, an embedded processor, a microprocessor, a hardware control logic, a hardware finite state machine (FSM), a digital signal processor (DSP), or a combination thereof. The first control interface 422 can be used for communication between the first control unit 412 and other functional units in the first device 102. The first control interface 422 can also be used for communication that is external to the first device 102.

The first control interface 422 can receive information from the other functional units or from external sources, or can transmit information to the other functional units or to external destinations. The external sources and the external destinations refer to sources and destinations physically separate from the first device 102.

The first control interface 422 can be implemented in different ways and can include different implementations depending on which functional units or external units are being interfaced with the first control interface 422. For example, the first control interface 422 can be implemented with a pressure sensor, an inertial sensor, a microelectromechanical system (MEMS), optical circuitry, waveguides, wireless circuitry, wireline circuitry, or a combination thereof.

The location unit 420 can generate location information, current heading, and current speed of the first device 102, as examples. The location unit 420 can be implemented in many ways. For example, the location unit 420 can function as at least a part of a global positioning system (GPS), an inertial navigation system, a cellular-tower location system, a pressure location system, or any combination thereof.

The location unit 420 can include a location interface 432. The location interface 432 can be used for communication between the location unit 420 and other functional units in the first device 102. The location interface 432 can also be used for communication that is external to the first device 102.

The location interface 432 can receive information from the other functional units or from external sources, or can transmit information to the other functional units or to external destinations. The external sources and the external destinations refer to sources and destinations physically separate from the first device 102.

The location interface 432 can include different implementations depending on which functional units or external units are being interfaced with the location unit 420. The location interface 432 can be implemented with technologies and techniques similar to the implementation of the first control interface 422.

The first storage unit 414 can store the first software 426. The first storage unit 414 can also store the relevant information, such as advertisements, points of interest (POI), navigation routing entries, or any combination thereof.

The first storage unit 414 can be a volatile memory, a nonvolatile memory, an internal memory, an external memory, or a combination thereof. For example, the first storage unit 414 can be a nonvolatile storage such as non-volatile random access memory (NVRAM), Flash memory, disk storage, or a volatile storage such as static random access memory (SRAM).

The first storage unit 414 can include a first storage interface 424. The first storage interface 424 can be used for communication between the location unit 420 and other functional units in the first device 102. The first storage interface 424 can also be used for communication that is external to the first device 102.

The first storage interface 424 can receive information from the other functional units or from external sources, or can transmit information to the other functional units or to external destinations. The external sources and the external destinations refer to sources and destinations physically separate from the first device 102.

The first storage interface 424 can include different implementations depending on which functional units or external units are being interfaced with the first storage unit 414. The first storage interface 424 can be implemented with technologies and techniques similar to the implementation of the first control interface 422.

The first communication unit 416 can enable external communication to and from the first device 102. For example, the first communication unit 416 can permit the first device 102 to communicate with the second device 106, an attachment, such as a peripheral device or a computer desktop, and the communication path 104.

The first communication unit 416 can also function as a communication hub allowing the first device 102 to function as part of the communication path 104 and not limited to be an end point or terminal unit to the communication path 104. The first communication unit 416 can include active and passive components, such as microelectronics or an antenna, for interaction with the communication path 104.

The first communication unit 416 can include a first communication interface 428. The first communication interface 428 can be used for communication between the first communication unit 416 and other functional units in the first device 102. The first communication interface 428 can receive information from the other functional units or can transmit information to the other functional units.

The first communication interface 428 can include different implementations depending on which functional units are being interfaced with the first communication unit 416. The first communication interface 428 can be implemented with technologies and techniques similar to the implementation of the first control interface 422.

The first user interface 418 allows a user (not shown) to interface and interact with the first device 102. The first user interface 418 can include an input device and an output device. Examples of the input device of the first user interface 418 can include a keypad, a touchpad, soft-keys, a keyboard, a microphone, a camera, or any combination thereof to provide data and communication inputs.

The first user interface 418 can include a first display interface 430. The first display interface 430 can include a display, a projector, a video screen, a speaker, a headset, or any combination thereof.

The first control unit 412 can operate the first user interface 418 to display information generated by the navigation system 100. The first control unit 412 can also execute the first software 426 for the other functions of the navigation system 100, including receiving location information from the location unit 420. The first control unit 412 can further execute the first software 426 for interaction with the communication path 104 via the first communication unit 416.

The second device 106 can be optimized for implementing the present invention in a multiple device embodiment with the first device 102. The second device 106 can provide the additional or higher performance processing power compared to the first device 102. The second device 106 can include a second control unit 434, a second communication unit 436, and a second user interface 438.

The second user interface 438 allows a user (not shown) to interface and interact with the second device 106. The second user interface 438 can include an input device and an output device. Examples of the input device of the second user interface 438 can include a keypad, a touchpad, soft-keys, a keyboard, a microphone, a camera, or any combination thereof to provide data and communication inputs. Examples of the output device of the second user interface 438 can include a second display interface 440. The second display interface 440 can include a display, a projector, a video screen, a speaker, a headset, or any combination thereof.

The second control unit 434 can execute a second software 442 to provide the intelligence of the second device 106 of the navigation system 100. The second software 442 can operate in conjunction with the first software 426. The second control unit 434 can provide additional performance compared to the first control unit 412.

The second control unit 434 can operate the second user interface 438 to display information. The second control unit 434 can also execute the second software 442 for the other functions of the navigation system 100, including operating the second communication unit 436 to communicate with the first device 102 over the communication path 104.

The second control unit 434 can be implemented in a number of different manners. For example, the second control unit 434 can be a processor, an embedded processor, a microprocessor, a hardware control logic, a hardware finite state machine (FSM), a digital signal processor (DSP), or a combination thereof.

The second control unit 434 can include a second control interface 444. The second control interface 444 can be used for communication between the second control unit 434 and other functional units in the second device 106. The second control interface 444 can also be used for communication that is external to the second device 106.

The second control interface 444 can receive information from the other functional units or from external sources, or can transmit information to the other functional units or to external destinations. The external sources and the external destinations refer to sources and destinations physically separate from the second device 106.

The second control interface 444 can be implemented in different ways and can include different implementations depending on which functional units or external units are being interfaced with the second control interface 444. For example, the second control interface 444 can be implemented with a pressure sensor, an inertial sensor, a microelectromechanical system (MEMS), optical circuitry, waveguides, wireless circuitry, wireline circuitry, or a combination thereof.

A second storage unit 446 can store the second software 442. The second storage unit 446 can also store the relevant information, such as advertisements, points of interest (POI), navigation routing entries, or any combination thereof. The second storage unit 446 can be sized to provide the additional storage capacity to supplement the first storage unit 414.

For illustrative purposes, the second storage unit 446 is shown as a single element, although it is understood that the second storage unit 446 can be a distribution of storage elements. Also for illustrative purposes, the navigation system 100 is shown with the second storage unit 446 as a single hierarchy storage system, although it is understood that the navigation system 100 can have the second storage unit 446 in a different configuration. For example, the second storage unit 446 can be formed with different storage technologies forming a memory hierarchal system including different levels of caching, main memory, rotating media, or off-line storage.

The second storage unit 446 can be a volatile memory, a nonvolatile memory, an internal memory, an external memory, or a combination thereof. For example, the second storage unit 446 can be a nonvolatile storage such as non-volatile random access memory (NVRAM), Flash memory, disk storage, or a volatile storage such as static random access memory (SRAM).

The second storage unit 446 can include a second storage interface 448. The second storage interface 448 can be used for communication between the location unit 420 and other functional units in the second device 106. The second storage interface 448 can also be used for communication that is external to the second device 106.

The second storage interface 448 can receive information from the other functional units or from external sources, or can transmit information to the other functional units or to external destinations. The external sources and the external destinations refer to sources and destinations physically separate from the second device 106.

The second storage interface 448 can include different implementations depending on which functional units or external units are being interfaced with the second storage unit 446. The second storage interface 448 can be implemented with technologies and techniques similar to the implementation of the second control interface 444.

The second communication unit 436 can enable external communication to and from the second device 106. For example, the second communication unit 436 can permit the second device 106 to communicate with the first device 102 over the communication path 104.

The second communication unit 436 can also function as a communication hub allowing the second device 106 to function as part of the communication path 104 and not limited to be an end point or terminal unit to the communication path 104. The second communication unit 436 can include active and passive components, such as microelectronics or an antenna, for interaction with the communication path 104.

The second communication unit 436 can include a second communication interface 450. The second communication interface 450 can be used for communication between the second communication unit 436 and other functional units in the second device 106. The second communication interface 450 can receive information from the other functional units or can transmit information to the other functional units.

The second communication interface 450 can include different implementations depending on which functional units are being interfaced with the second communication unit 436. The second communication interface 450 can be implemented with technologies and techniques similar to the implementation of the second control interface 444.

The first communication unit 416 can couple with the communication path 104 to send information to the second device 106 in the first device transmission 408. The second device 106 can receive information in the second communication unit 436 from the first device transmission 408 of the communication path 104.

The second communication unit 436 can couple with the communication path 104 to send information to the first device 102 in the second device transmission 410. The first device 102 can receive information in the first communication unit 416 from the second device transmission 410 of the communication path 104. The navigation system 100 can be executed by the first control unit 412, the second control unit 434, or a combination thereof.

A first detecting sensor 452 can represent the detecting sensor 330 of FIG. 3. Examples of the first detecting sensor 452 can include a digital camera, video camera, thermal camera, night vision camera, infrared camera, x-ray camera, or the combination thereof. Examples of the first detecting sensor 452 can include accelerometer, thermometer, microphone, wireless signal receiver, remote physiological monitoring device, light identifier, or the combination thereof.

A second detecting sensor 454 can represent the detecting sensor 330 of FIG. 3. Examples of the second detecting sensor 454 can include a digital camera, video camera, thermal camera, night vision camera, infrared camera, x-ray camera, or the combination thereof. Examples of the second detecting sensor 454 can include accelerometer, thermometer, microphone, wireless signal receiver, remote physiological monitoring device, light identifier, or the combination thereof.

For illustrative purposes, the second device 106 is shown with the partition having the second user interface 438, the second storage unit 446, the second control unit 434, and the second communication unit 436, although it is understood that the second device 106 can have a different partition. For example, the second software 442 can be partitioned differently such that some or all of its function can be in the second control unit 434 and the second communication unit 436. Also, the second device 106 can include other functional units not shown in FIG. 4 for clarity.

The functional units in the first device 102 can work individually and independently of the other functional units. The first device 102 can work individually and independently from the second device 106 and the communication path 104.

The functional units in the second device 106 can work individually and independently of the other functional units. The second device 106 can work individually and independently from the first device 102 and the communication path 104.

For illustrative purposes, the navigation system 100 is described by operation of the first device 102 and the second device 106. It is understood that the first device 102 and the second device 106 can operate any of the modules and functions of the navigation system 100. For example, the first device 102 is described to operate the location unit 420, although it is understood that the second device 106 can also operate the location unit 420.

Figures 5, 6:
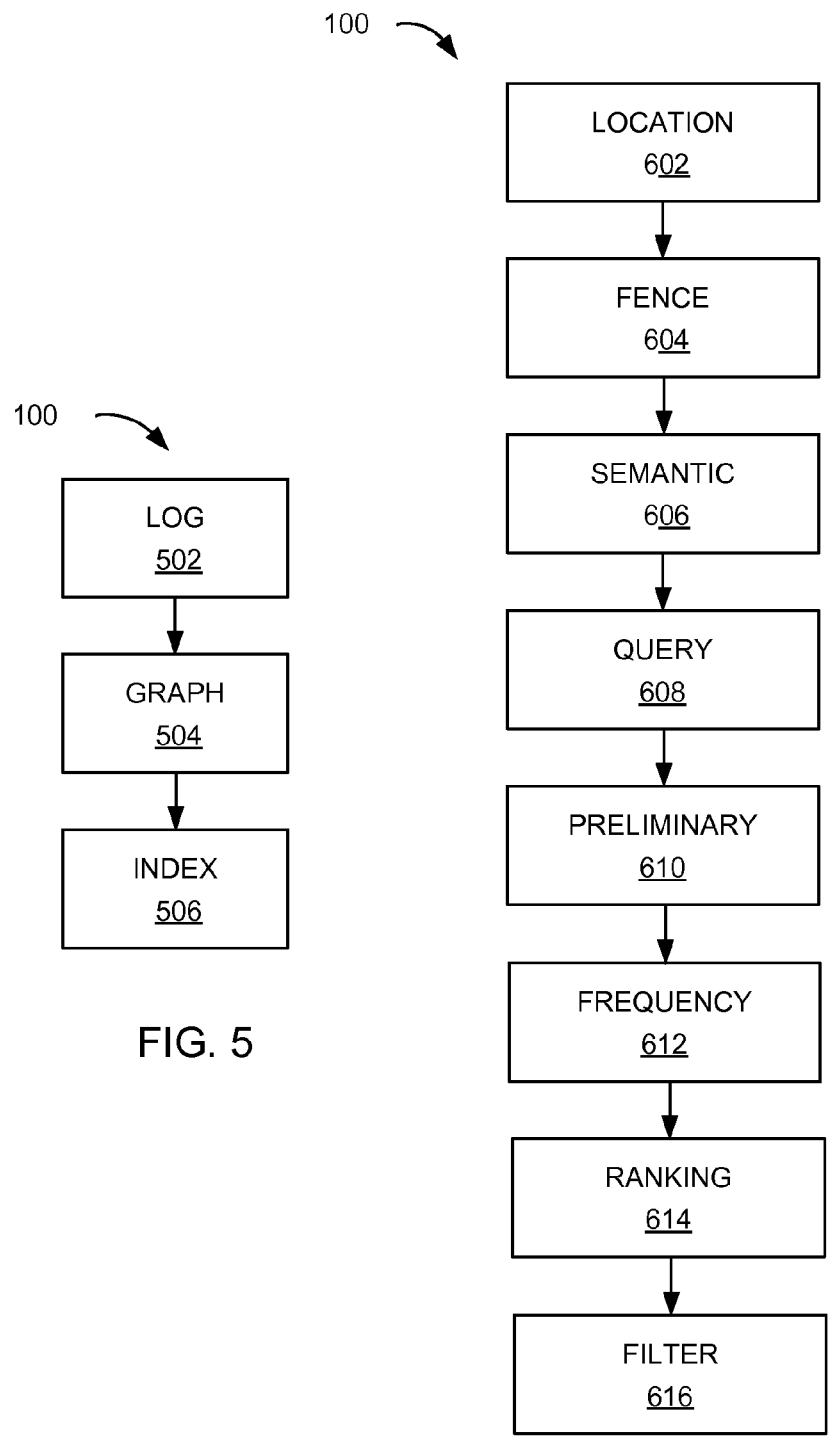
FIG. 5 is a first control flow of the navigation system.
FIG. 6 is a second control flow of the navigation system.

Referring now to FIG. 5, therein is shown a first control flow of the navigation system 100. The navigation system 100 can include a log module 502. The log module 502 generates the activity log 302 of FIG. 3. For example, the log module 502 can generate the activity log 302 based on the query input 204 of FIG. 2.

The log module 502 can generate the activity log 302 in a number of ways. For example, the log module 502 can generate the activity log 302 including the query input 204. More specifically as an example, the log module 502 can generate the activity log 302 including the input location 206 of FIG. 2, the timeframe 304 of FIG. 3, or a combination thereof where and when the query input 204 was made on the first device 102 of FIG. 1.

For a different example, the log module 502 can generate the activity log 302 including the point of interest 306 of FIG. 3 and the travel frequency 314 of FIG. 3 to the point of interest 306. More specifically as an example, the activity log 302 can include the query input 204 querying for the point of interest 306. For further example, the log module 502 can generate the activity log 302 including the category of interest 308 of FIG. 3 and the travel frequency 314 to the point of interest 306 with the particular instance of the category of interest 308.

For another example, the log module 502 can generate the activity log 302 including the user ID 310 of FIG. 3, the group ID 312 of FIG. 3, or a combination thereof entering the query input 204. For further example, the activity log 302 can include the search context 216 of when, where, and how the query input 204 is made on the first device 102. The search context 216 can include the weather, the timeframe 304, the input location 206, or a combination thereof.

For further example, the log module 502 can generate a plurality of the activity log 302 per instance of the query input 204, the input location 206, the point of interest 306, the travel frequency 314, the timeframe 304, the user ID 310, the group ID 312, the search context 216, or a combination thereof. More specifically as an example, the log module 502 can organize the plurality of the activity log 302 based on the query input 204, the input location 206, the point of interest 306, the travel frequency 314, the timeframe 304, the user ID 310, the group ID 312, the search context 216, or a combination thereof. The log module 502 can communicate the activity log 302 to a graph module 504.

The navigation system 100 can include the graph module 504, which can couple to the log module 502. The graph module 504 generates the log graph 318 of FIG. 3. For example, the graph module 504 can generate the log graph 318 based on the activity log 302.

The graph module 504 can generate the log graph 318 in a number of ways. For example, the graph module 504 can generate the log graph 318 representing the bi-graph that is weighted. More specifically as an example, the log graph 318 can include the input node 320 of FIG. 3, the POI node 322 of FIG. 3, the frequency weight 324 of FIG. 3, or a combination thereof.

For further example, the activity log 302 can include a plurality of the query input 204 representing queries made to the navigation system 100 by the user. Based on the query input 204, the activity log 302 can track the point of interest 306 visited by the user and the travel frequency 314 to the point of interest 306.

The graph module 504 can generate the log graph 318 connecting the input node 320 representing the query input 204 to the POI node 322 representing the point of interest 306. More specifically as an example, the log module 502 can connect the input node 320 and the POI node 322 with the edge including the frequency weight 324. The frequency weight 324 can be weighted according to the travel frequency 314 to the point of interest 306.

For further example, the graph module 504 can generate the log graph 318 including a plurality of the input node 320 connecting one instance of the POI node 322. In contrast, the graph module 504 can generate the log graph 318 including a plurality of the POI node 322 connected by one instance of the input node 320.

For a different example, the graph module 504 can generate the log graph 318 with a plurality of the graph type 360 of FIG. 3. The graph module 504 can generate the log graph 318 representing the public graph 326 of FIG. 3. More specifically as an example, the activity log 302 can include a plurality of the query input 204 from all users of the navigation system 100. The graph module 504 can generate the public graph 326 based on aggregating a plurality of the activity log 302 which was based on all users of the navigation system 100 as discussed above.

For another example, the graph module 504 can generate the log graph 318 representing the personalized graph 328 of FIG. 3. More specifically as an example, the activity log 302 can include a plurality of the query input 204 from one particular user of the navigation system 100. The graph module 504 can generate the personalized graph 328 based on aggregating a plurality of the activity log 302 from a particular user with the specific instance of the user ID 310 as discussed above.

For a different example, the graph module 504 can generate the log graph 318 representing the group graph 330 of FIG. 3. More specifically as an example, the activity log 302 can include a plurality of the query input 204 from a particular group of users of the navigation system 100. The graph module 504 can generate the group graph 330 based on aggregating a plurality of the activity log 302 from particular users that belong in a group having a specific instance of the group ID 312 as discussed above.

For another example, the graph module 504 can generate the log graph 318 representing the context graph 332 of FIG. 3. More specifically as an example, the activity log 302 can include a plurality of the query input 204 made in a particular instance of the search context 216. The graph module 504 can generate the context graph 332 based on aggregating a plurality of the activity log 302 sharing a specific instance of the search context 216 as discussed above. More specifically as an example, a plurality of the activity log 302 can include the search context 216 of the query input 204 looking for a theme park representing "Great America." The graph module 504 can generate the context graph 332 based on aggregating the plurality of the activity log 302 for the search context 216 representing a search for "Great America." The graph module 504 can communicate the log graph 318 to an index module 506.

It has been discovered that the navigation system 100 generating the public graph 326, the personalized graph 328, the group graph 330, the context graph 332, or a combination thereof improves the personalization and efficiency of obtaining the search result 202 tailored to the user's need. More specifically as an example, by generating the log graph 318 for particular instance of the user ID 310, the group ID 312, the search context 216, or a combination thereof, the navigation system 100 can alleviate the inefficiency from searching on the public graph 326 that includes information undesired by the user. As a result, the navigation system 100 can improve the efficiency by generating the log graph 318 tailored to the user's need for enhanced personalization for operating the first device 102, the navigation system 100, or a combination thereof.

The navigation system 100 can include the index module 506, which can couple to the graph module 504. The index module 506 generates the search index 334 of FIG. 3. For example, the index module 506 can generate the search index 334 based on the log graph 318.

The index module 506 can generate the search index 334 in a number of ways. For example, the index module 506 can generate the search index 334 based on ranking a plurality of the activity log 302. More specifically as an example, the index module 506 can generate the search index 334 based on ranking a plurality of the activity log 302 from the highest instance of the travel frequency 314 to the lowest instance of the travel frequency 314. For further example, the index module 506 can generate the search index 334 based on sorting the log graph 318 by ranking the plurality of the activity log 302 as discussed above.

The index module 506 can generate a plurality of the search index 334. For example, the index module 506 can generate the personalized index 338 of FIG. 3 based on the personalized graph 328. The index module 506 can generate the group index 340 of FIG. 3 based on the group graph 330. The index module 506 can generate the context index 342 of FIG. 3 based on the context graph 332. The index module 506 can generate the public index 336 of FIG. 3 for the search index 334 accessed by all users of the navigation system 100 or the public.

Referring now to FIG. 6, therein is shown a second control flow of the navigation system 100. The navigation system 100 can include a location module 602. The location module 602 determines the input location 206 of FIG. 2. For example, the location module 602 can determine the input location 206 of where the query input 204 was made on the first device 102. More specifically as an example, the location module 602 can determine the input location 206 via the location unit 420 of FIG. 4 for locating the physical location represented in latitude and longitude information of where the query input 204 was made. The location module 602 can communicate the input location 206 to a fence module 604.

The navigation system 100 can include the fence module 604, which can couple to the location module 602. The fence module 604 generates the geofence 208 of FIG. 2. For example, the fence module 604 can generate the geofence 208 based on the input location 206.

The fence module 604 can generate the geofence 208 in a number of ways. For example, the fence module 604 can convert the latitude and longitude information of the input location 206 into a geohash. The geohash can represent a hash code representation of the latitude and longitude information.

For a specific example, the input location 206 can be represented as latitude of 37.401 and the longitude of −121.987. The fence module 604 can calculate the geohash representing "9q9k" based on the latitude and longitude information. The fence module 604 can generate the geofence 208 identified by the geohash representing "9q9k."

For further example, the fence module 604 can generate the geofence 208 based on the predefined distance 212 of FIG. 2 from the input location 206. More specifically as an example, the fence module 604 can determine the outer extent of the geofence 208 based on the predefined distance 212 from the input location 206.

For another example, the fence module 604 can generate the geofence 208 based on establishing the boundary 210 of FIG. 2 surrounding the input location 206. More specifically as an example, as discussed above, the fence module 604 can determine an area, a length, or a combination thereof of the boundary 210 based on the predefined distance 212 from the input location 206.

For a different example, the fence module 604 can determine the boundary 210 as the geographic area of the neighborhood, city, county, state, country, or a combination thereof. Moreover, the fence module 604 can determine the boundary 210 of the geofence 208 as a subsection or entire geographic area the neighborhood, city, county, state, country, or a combination thereof. For further example, the shape of the boundary 210 can represent a polygon, a circle, an amorphous shape, or a combination thereof. The fence module 604 can communicate the geofence 208 to a semantic module 606.

The navigation system 100 can include the semantic module 606, which can couple to the fence module 604. The semantic module 606 generates the semantic query 346 of FIG. 3. For example, the semantic module 606 can generate the semantic query 346 based on the query input 204.

For a specific example, the semantic module 606 can generate the semantic query 346 based on modifying the query input 204. The semantic module 606 can generate the semantic query 346 based on autocompleting, autocorrecting, or a combination thereof of the query input 204.

As an example, the query input 204 can represent "great." Based on the query input 204, the semantic module 606 can generate the semantic query 346 by autocompleting "great" into a prefix representing "great*." The semantic module 606 can communicate the semantic query 346 to a query module 608.

The navigation system 100 can include the query module 608, which can couple to the semantic module 606. The query module 608 generates the search query 344 of FIG. 3. For example, the query module 608 can generate the search query 344 based on aggregating the semantic query 346, the geofence 208, the input location 206, or a combination thereof. More specifically as an example, the query module 608 can generate the search query 344 for the query input 204 relevant to the geofence 208 where the input location 206 is detected. The query module 608 can communicate the search query 344 to a preliminary module 610.

The navigation system 100 can include the preliminary module 610, which can couple to the query module 608. The preliminary module 610 generates the preliminary result 348 of FIG. 3. For example, the preliminary module 610 can generate the preliminary result 348 based on searching the search index 334 of FIG. 3.

The preliminary module 610 can generate the preliminary result 348 in a number of ways. For example, the preliminary module 610 can generate the preliminary result 348 based on searching the search index 334 with the search query 344. As discussed above, the search query 344 can include the semantic query 346, the geofence 208, the input location 206, or a combination thereof. Based on the semantic query 346, the preliminary module 610 can generate the preliminary result 348 including the point of interest 306 relevant to the semantic query 346 and filter out the point of interest 306 irrelevant to the semantic query 346.

For further example, the preliminary module 610 can generate the preliminary result 348 by filtering out the point of interest 306 outside of the geofence 208. For a different example, the preliminary module 610 can generate the preliminary result 348 by filtering out the point of interest 306 with the predefined distance 212 meeting or exceeding the distance threshold 214 of FIG. 2.

More specifically as an example, even if the point of interest 306 maybe outside of the geofence 208, the preliminary module 610 can include the point of interest 306 within the preliminary result 348. For a specific example, the preliminary module 610 can include the point of interest 306 in the preliminary result 348 if the predefined distance 212 from the input location 206, the boundary 210 of the geofence 208, a location within the geofence 208, or a combination thereof to the point of interest 306 is under the distance threshold 214.

It has been discovered that the navigation system 100 generating the preliminary result 348 based on filtering the point of interest 306 improves the efficiency of generating the search result 202. By including or excluding the point of interest 306 inside or outside of the geofence 208 based on the comparison of the predefined distance 212 and the distance threshold 214, the navigation system 100 can generate the preliminary result 348 tailored to the user's need. As a result, the navigation system 100 can improve the efficiency to enhance the personalization of operating the first device 102, the navigation system 100, or a combination thereof.

For a different example, the preliminary module 610 can generate the preliminary result 348 based on the index type 358 of FIG. 3 of the search index 334. As discussed above, the index type 358 can include the personalized index 338 of FIG. 3, the group index 340 of FIG. 3, the context index 342 of FIG. 3, the public index 336 of FIG. 3, or a combination thereof. The preliminary module 610 can search on different instances of the search index 334 based on the search query 344, the user ID 310 of FIG. 3, the group ID 312 of FIG. 3, the search context 216 of FIG. 2, the geofence 208 or a combination thereof.

For a specific example, the preliminary module 610 can search the personalized index 338 based on the user ID 310, the geofence 208, the search context 216, or a combination thereof. The user, the navigation system 100 can specify the search on the personalized index 338 rather than the public index 336 based on the geofence 208, the search context 216, or a combination thereof.

More specifically as an example, the preliminary module 610 can search the personalized index 338 based on locating the input location 206 relative to the geofence 208. As an example, the preliminary module 610 can search the personalized index 338 if the input location 206 is detected within the geofence 208. In contrast, the preliminary module 610 can search the public index 336 if the input location 206 is outside of the geofence 208.

For a different example, the preliminary module 610 can search the personalized index 338 based on the search context 216. More specifically as an example, the search context 216 can represent the input location 206 being detected in different instances of the geofence 208. For example, one instance of the geofence 208 can represent the boundary 210 surrounding the point of interest 306 representing the user's home. The other instance of the geofence 208 can represent the boundary 210 surrounding the point of interest 306 representing the user's workplace where the workplace is at a different location from the user's home.

The preliminary module 610 can search the personalized index 338 tailored to the geofence 208 for the user's home if the input location 206 is detected within the boundary 210 surrounding the user's home. For a different example, the preliminary module 610 can search the personalized index 338 tailored to the geofence 208 for the user's workplace if the input location 206 is detected within the boundary 210 surrounding the user's workplace.

For another example, the preliminary module 610 can search the personalized index 338 based on the search context 216 for searching for a particular instance of the category of interest 308 of FIG. 3. More specifically as an example, the personalized index 338 can be categorized according to the category of interest 308 to tailor to the search context 216. For example, the category of interest 308 can represent places to visit during summer vacation. The preliminary module 610 can search the personalized index 338 for the category of interest 308.

It has been discovered that the navigation system 100 performing the search on the personalized index 338 improves the efficiency by personalizing the search. More specifically as an example, by limiting the search to the personalized index 338, the navigation system 100 can eliminate the unnecessary resource allocated to search on the search index 334 irrelevant to the user. As a result, the navigation system 100 can improve the efficiency by real-locating extra resources obtain from searching on the personalized index 338 for improved operation of the first device 102, the navigation system 100, or a combination thereof.

For a different example, the preliminary module 610 can search the group index 340 based on a plurality of the input location 206 detected. More specifically as an example, the preliminary module 610 can search the group index 340 similarly as discussed for searching the personalized index 338. For example, the preliminary module 610 can search the group index 340 if one user or all users grouped in the group ID 312 is/are detected within the geofence 208.

For a different example, the preliminary module 610 can search the context index 342 based on the search context 216. More specifically as an example, the search context 216 can represent that the user is traveling in weather condition of rain. The preliminary module 610 can search the context index 342 where the search index 334 that is tailored to the weather condition of rain.

For further example, the search context 216 can represent that the query input 204 is made on the timeframe 304 of Tuesday in December. The preliminary module 610 can search the context index 342 where the search index 334 is tailored to the timeframe 304 when the query input 204 is made. For further example, the user of the navigation system 100 can specify the search context 216, such as the timeframe 304, to control which instance of the context index 342 to be searched by the preliminary module 610.

For further example, the preliminary module 610 can search the public index 336 over other instances of the search index 334 based on the result count 354 of FIG. 3 below the result threshold 356 of FIG. 3. For a specific example, the preliminary module 610 can initially search the personalized index 338 based on the input location 206 detected within the geofence 208. However, the result count 354 for the personalized index 338 is below the result threshold 356. As a result, the preliminary module 610 can search again on the public index 336 to provide sufficient number of the result count 354. The preliminary module 610 can search the public index 336 if the result count 354 is below the result threshold 356 for the group index 340, the context index 342, or a combination thereof similarly as the personalized index 338. The preliminary module 610 can communicate the preliminary result 348 to a frequency module 612.

It has been discovered that the navigation system 100 switching between different instances of the search index 334 improves the efficiency for obtaining the search result 202 for the user. By comparing the result count 354 to the result threshold 356, the navigation system 100 can select the search index 334 most suited to user for the geofence 208, the search context 216, or a combination thereof. As a result, the navigation system 100 can improve the efficiency of delivering the search result 202 by searching the best instance of the search index 334 to obtain the preliminary result 348.

The navigation system 100 can include the frequency module 612, which can couple to the preliminary module 610. The frequency module 612 aggregates a plurality of the activity log 302 of FIG. 3. For example, the frequency module 612 can aggregate the plurality of the activity log 302 based on determining the travel frequency 314 for the point of interest 306, the category of interest 308, the activity log 302 of FIG. 3, or a combination thereof.

The frequency module 612 can aggregate the activity log 302 based on the travel frequency 314 in a number of ways. For example, the activity log 302 can include the travel frequency 314 traveled by the user to particular instance of the point of interest 306. The frequency module 612 can aggregate a plurality of the activity log 302 based on the travel frequency 314 for a particular instance of the point of interest 306. For a different example, the frequency module 612 can aggregate a plurality of the activity log 302 based on the travel frequency 314 to the point of interest 306 with a particular instance of the category of interest 308. For another example, the frequency module 612 can aggregate a plurality of the activity log 302 based on the travel frequency 314 for traveling from particular instance of the starting location 316 to another instance of the point of interest 306. The frequency module 612 can communicate the travel frequency 314 to a ranking module 614.

The navigation system 100 can include the ranking module 614, which can couple to the frequency module 612. The ranking module 614 generates the result ranking 350 of FIG. 3. For example, the ranking module 614 can generate the result ranking 350 based on a plurality of the preliminary result 348, a plurality of the activity log 302 aggregated, or a combination thereof.

More specifically as an example, the ranking module 614 can generate the result ranking 350 based on ranking a plurality of the preliminary result 348 according to the travel frequency 314. The result ranking 350 can include the preliminary result 348 with the highest instance of the travel frequency 314 at the top of the result ranking 350 and the preliminary result 348 with the lowest instance of the travel frequency 314 at the bottom of the result ranking 350. The ranking module 614 can communicate the result ranking 350 to a filter module 616.

The navigation system 100 can include the filter module 616, which can couple to the ranking module 614. The filter module 616 generates the search result 202 of FIG. 2. For example, the filter module 616 can generate the search result 202 based on filtering the result ranking 350 based on the travel frequency 314 meeting or exceeding the travel threshold 352 of FIG. 3.

More specifically as an example, the filter module 616 can generate the search result 202 based on removing the preliminary result 348 with the travel frequency 314 of less than the travel threshold 352 from the result ranking 350. The filter module 616 can communicate the search result 202 to the log module 502 of FIG. 5. The log module 502 can receive the output generated by the location module 602, the fence module 604, the semantic module 606, the query module 608, preliminary module 610, the frequency module 612, the ranking module 614, the filter module 616, or a combination thereof for updating the activity log 302.

The physical transformation from traversing in and out of the geofence 208 results in the movement in the physical world, such as people using the first device 102, the vehicle, or a combination thereof, based on the operation of the navigation system 100. As the movement in the physical world occurs, the movement itself creates additional information that is converted back into generating the search query 344, the preliminary result 348, the result ranking 350, the search result 202, or a combination thereof for the continued operation of the navigation system 100 and to continue the movement in the physical world.

The first software 426 of FIG. 4 of the first device 102 of FIG. 4 can include the modules for the navigation system 100. For example, the first software 426 can include the log module 502, the graph module 504 of FIG. 5, the index module 506 of FIG. 5, the location module 602, the fence module 604, the semantic module 606, the query module 608, the preliminary module 610, the frequency module 612, the ranking module 614, and the filter module 616.

The first control unit 412 of FIG. 4 can execute the first software 426 for the log module 502 to generate the activity log 302. The first control unit 412 can execute the first software 426 for the graph module 504 to generate the log graph 318 of FIG. 3. The first control unit 412 can execute the first software 426 for the index module 506 to generate the search index 334.

The first control unit 412 can execute the first software 426 for the location module 602 to determine the input location 206. The first control unit 412 can execute the first software 426 for fence module 604 to generate the geofence 208. The first control unit 412 can execute the first software 426 for the semantic module 606 to generate the semantic query 346.

The first control unit 412 can execute the first software 426 for the query module 608 to generate the search query 344. The first control unit 412 can execute the first software 426 for the preliminary module 610 to generate the preliminary result 348. The first control unit 412 can execute the first software 426 for the frequency module 612 to aggregate a plurality of the activity log 302 based on the travel frequency 314.

The first control unit 412 can execute the first software 426 for the ranking module 614 to generate the result ranking 350. The first control unit 412 can execute the first software 426 for the filter module 616 to generate the search result 202.

The second software 442 of FIG. 4 of the second device 106 of FIG. 4 can include the modules for the navigation system 100. For example, the second software 442 can include the log module 502, the graph module 504, index module 506, the location module 602, the fence module 604, the semantic module 606, the query module 608, the preliminary module 610, the frequency module 612, the ranking module 614, and the filter module 616.

The second control unit 434 of FIG. 4 can execute the second software 442 for the log module 502 to generate the activity log 302. The second control unit 434 can execute the second software 442 for the graph module 504 to generate the log graph 318 of FIG. 3. The second control unit 434 can execute the second software 442 for the index module 506 to generate the search index 334.

The second control unit 434 can execute the second software 442 for the location module 602 to determine the input location 206. The second control unit 434 can execute the second software 442 for fence module 604 to generate the geofence 208. The second control unit 434 can execute the second software 442 for the semantic module 606 to generate the semantic query 346.

The second control unit 434 can execute the second software 442 for the query module 608 to generate the search query 344. The second control unit 434 can execute the second software 442 for the preliminary module 610 to generate the preliminary result 348. The second control unit 434 can execute the second software 442 for the frequency module 612 to aggregate a plurality of the activity log 302 based on the travel frequency 314.

The second control unit 434 can execute the second software 442 for the ranking module 614 to generate the result ranking 350. The second control unit 434 can execute the second software 442 for the filter module 616 to generate the search result 202.

The modules of the navigation system 100 can be partitioned between the first software 426 and the second software 442. The second software 442 can include the log module 502, the graph module 504, index module 506, the fence module 604, the semantic module 606, the query module 608, the preliminary module 610, the frequency module 612, the ranking module 614, and the filter module 616. The second control unit 434 can execute modules partitioned on the second software 442 as previously described.

The first software 426 can include the location module 602. Based on the size of the first storage unit 414, the first software 426 can include additional modules of the navigation system 100. The first control unit 412 can execute the modules partitioned on the first software 426 as previously described.

The first control unit 412 can operate the first communication interface 428 of FIG. 4 to communicate the activity log 302, the input location 206, the geofence 208, the semantic query 346, the search query 344, the preliminary result 348, the result ranking 350, the search result 202, or a combination thereof to or from the second device 106. The first control unit 412 can operate the first software 426 to operate the location unit 420 of FIG. 4. The second control unit 434 can operate the second communication interface 450 of FIG. 4 to communicate the activity log 302, the input location 206, the geofence 208, the semantic query 346, the search query 344, the preliminary result 348, the result ranking 350, the search result 202, or a combination thereof to or from the first device 102 through the communication path 104 of FIG. 4.

The first control unit 412 can operate the first user interface 418, the second user interface 438 of FIG. 4, or a combination thereof to display the input location 206, the geofence 208, the search result 202, a geographic region, or a combination thereof. More specifically, the first user interface 418, the second user interface 438, or a combination thereof can display the digital representation of the input location 206, the geofence 208, the search result 202, a geographic region, or a combination thereof to represent the physical world.

The navigation system 100 describes the module functions or order as an example. The modules can be partitioned differently. For example, the query module 608 and the semantic module 606 can be combined. Each of the modules can operate individually and independently of the other modules. Furthermore, data generated in one module can be used by another module without being directly coupled to each other. For example, the frequency module 612 can receive the activity log 302 from the log module 502. Further, "communicating" can represent sending, receiving, transmitting, or a combination thereof the data generated to or from one to another.

The modules described in this application can be hardware implementation or hardware accelerators in the first control unit 412 or in the second control unit 434. The modules can also be hardware implementation or hardware accelerators within the first device 102 or the second device 106 but outside of the first control unit 412 or the second control unit 434, respectively as depicted in FIG. 4. However, it is understood that the first control unit 412, the second control unit 434, or a combination thereof can collectively refer to all hardware accelerators for the modules.

The modules described in this application can be implemented as instructions stored on a non-transitory computer readable medium to be executed by the first control unit 412, the second control unit 434, or a combination thereof. The non-transitory computer medium can include the first storage unit 414 of FIG. 4, the second storage unit 446 of FIG. 4, or a combination thereof. The non-transitory computer readable medium can include non-volatile memory, such as a hard disk drive, non-volatile random access memory (NVRAM), solid-state storage device (SSD), compact disk (CD), digital video disk (DVD), or universal serial bus (USB) flash memory devices. The non-transitory computer readable medium can be integrated as a part of the navigation system 100 or installed as a removable portion of the navigation system 100.

Figure 7:
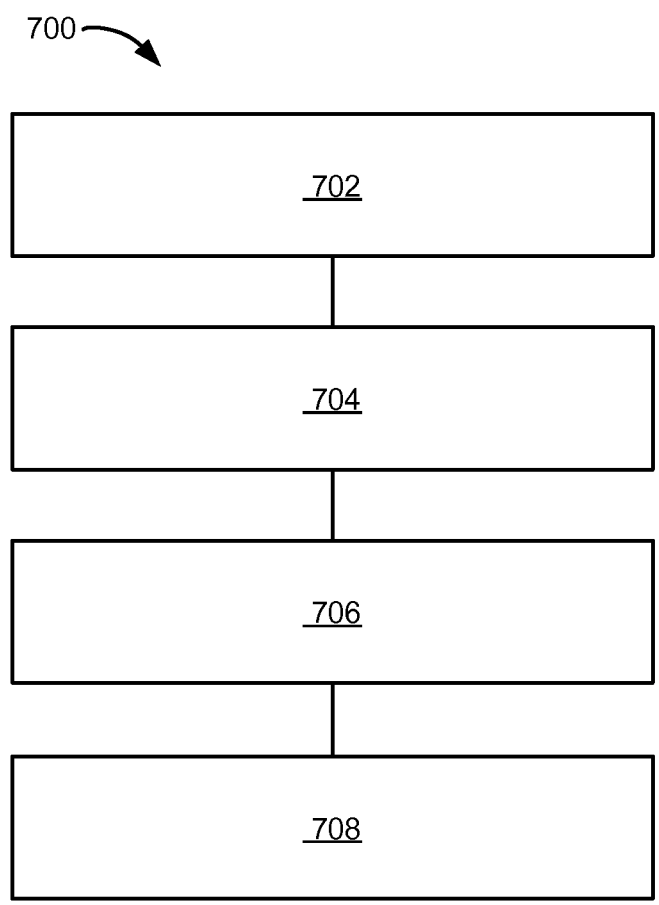
FIG. 7 is a flow chart of a method of operation of the navigation system in a further embodiment of the present invention.

Referring now to FIG. 7, therein is shown a flow chart of a method 700 of operation of the navigation system 100 in a further embodiment of the present invention. The method 700 includes: generating activity logs including a plurality of a travel frequency to a point of interest in a block 702; generating a search index including a plurality of an index type based on the activity logs with a control unit in a block 704; generating a preliminary result based on searching the search index with the index type tailored to a search context in a block 706; and generating a search result based on filtering the preliminary result including the travel frequency meeting or exceeding a travel threshold for displaying on a device in a block 708.

It has been discovered that the navigation system 100 generating a plurality of the activity log 302 including a plurality of the travel frequency 314 to the point of interest 306 improves the efficiency of operating the first device 102 of FIG. 1, the navigation system 100, or a combination thereof. By generating the activity log 302, the navigation system 100 can generate the search index 334 of FIG. 3 including a plurality of the index type 358 of FIG. 3. Furthermore, the navigation system 100 can generate the preliminary result 348 of FIG. 3 based on searching the search index 334 with the index type 358 tailored to the search context 216 of FIG. 2. As a result, the navigation system 100 can generate the search result 202 based on filtering the preliminary result 348 including the travel frequency 314 meeting or exceeding the travel threshold 352 of FIG. 3 to improve the efficiency of obtaining the search result 202 relevant to the user's intent.

The resulting method, process, apparatus, device, product, and/or system is straightforward, cost-effective, uncomplicated, highly versatile, accurate, sensitive, and effective, and can be implemented by adapting known components for ready, efficient, and economical manufacturing, application, and utilization. Another important aspect of the present invention is that it valuably supports and services the historical trend of reducing costs, simplifying systems, and increasing performance. These and other valuable aspects of the present invention consequently further the state of the technology to at least the next level.

While the invention has been described in conjunction with a specific best mode, it is to be understood that many alternatives, modifications, and variations will be apparent to those skilled in the art in light of the aforegoing description. Accordingly, it is intended to embrace all such alternatives, modifications, and variations that fall within the scope of the included claims. All matters hithertofore set forth herein or shown in the accompanying drawings are to be interpreted in an illustrative and non-limiting sense.

What is claimed is:

1. A method of operation of a navigation system comprising:
   generating activity logs including a plurality of a travel frequency representing a number of visits traveling to a point of interest;
   generating a search index including a plurality of an index type based on the activity logs with a control unit;
   generating a preliminary result based on searching the search index with the index type tailored to a search context; and
   generating a search result based on filtering the preliminary result including the travel frequency meeting or exceeding a travel threshold representing a minimum requirement for the number of visits traveling to the point of interest for displaying on a device.

2. The method as claimed in claim 1 further comprising generating a log graph based on the activity logs, the log graph including a plurality of a graph type tailored to the search context.

3. The method as claimed in claim 1 further comprising generating a geofence including a boundary based on a predefined distance from an input location tracked on the activity logs.

4. The method as claimed in claim 1 further comprising generating a result ranking based on ranking a plurality of the preliminary result according to the travel frequency.

5. The method as claimed in claim 1 further comprising aggregating the activity logs based on the travel frequency for traveling from a particular instance of a starting location.

6. The method as claimed in claim 1 further comprising searching a public index over other instance of the index type based on a result count below a result threshold.

7. The method as claimed in claim 1 further comprising searching a personalized index based on locating an input location relative to a geofence.

8. The method as claimed in claim 1 further comprising searching a context index based on the search context of where a query input is made.

9. The method as claimed in claim 1 wherein generating the search index includes generating the search index based on sorting a log graph by ranking the activity logs according to the travel frequency.

10. The method as claimed in claim 1 further comprising categorizing a personalized index according to a category of interest for tailoring to the search context.

11. A navigation system comprising:
a control unit including a processor for:
generating activity logs including a plurality of a travel frequency representing a number of visits traveling to a point of interest,
generating a search index including a plurality of an index type based on the activity logs,
generating a preliminary result based on searching the search index with the index type tailored to a search context,
generating a search result based on filtering the preliminary result including the travel frequency meeting or exceeding a travel threshold representing a minimum requirement for the number of visits traveling to the point of interest, and
a communication interface, coupled to the control unit, for communicating the search result for displaying on a device.

12. The system as claimed in claim 11 wherein the control unit is for generating a log graph based on the activity logs, the log graph including a plurality of a graph type tailored to the search context.

13. The system as claimed in claim 11 wherein the control unit is for generating a geofence including a boundary based on a predefined distance from an input location tracked on the activity logs.

14. The system as claimed in claim 11 wherein the control unit is for generating a result ranking based on ranking a plurality of the preliminary result according to the travel frequency.

15. The system as claimed in claim 11 wherein the control unit is for aggregating the activity logs based on the travel frequency for traveling from a particular instance of a starting location.

16. A non-transitory computer readable medium including instructions for execution, the instructions comprising:
generating activity logs including a plurality of a travel frequency representing a number of visits traveling to a point of interest;
generating a search index including a plurality of an index type based on the activity logs;
generating a preliminary result based on searching the search index with the index type tailored to a search context; and
generating a search result based on filtering the preliminary result including the travel frequency meeting or exceeding a travel threshold representing a minimum requirement for the number of visits traveling to the point of interest for displaying on a device.

17. The non-transitory computer readable medium as claimed in claim 16 further comprising generating a log graph based on the activity logs, the log graph including a plurality of a graph type tailored to the search context.

18. The non-transitory computer readable medium as claimed in claim 16 further comprising generating a geofence including a boundary based on a predefined distance from an input location tracked on the activity logs.

19. The non-transitory computer readable medium as claimed in claim 16 further comprising generating a result ranking based on ranking a plurality of the preliminary result according to the travel frequency.

20. The non-transitory computer readable medium as claimed in claim 16 further comprising aggregating the activity logs based on the travel frequency for traveling from a particular instance of a starting location.

* * * * *